(12) United States Patent
Imamura et al.

(10) Patent No.: US 11,533,455 B2
(45) Date of Patent: Dec. 20, 2022

(54) IMAGING APPARATUS AND DISTANCE MEASURING APPARATUS USING THE SAME

(71) Applicant: Panasonic Intellectual Property Management Co., Ltd., Osaka (JP)

(72) Inventors: Norihiro Imamura, Osaka (JP); Tsuguhiro Korenaga, Osaka (JP); Kunio Nobori, Osaka (JP); Takeo Azuma, Kyoto (JP); Kazufumi Mizusawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/228,525

(22) Filed: Apr. 12, 2021

(65) Prior Publication Data
US 2021/0235043 A1    Jul. 29, 2021

Related U.S. Application Data

(63) Continuation of application No. 16/932,270, filed on Jul. 17, 2020, now Pat. No. 11,006,081, which is a
(Continued)

(30) Foreign Application Priority Data

Apr. 30, 2014 (JP) ................................. 2014-093616

(51) Int. Cl.
*H04N 7/18* (2006.01)
*H04N 5/225* (2006.01)
(Continued)

(52) U.S. Cl.
CPC ............. *H04N 7/181* (2013.01); *G03B 35/08* (2013.01); *G06T 7/593* (2017.01); *H04N 5/2254* (2013.01);
(Continued)

(58) Field of Classification Search
None
See application file for complete search history.

(56) References Cited

U.S. PATENT DOCUMENTS 4,997,265 A    3/1991  Nishina
6,507,700 B1 *  1/2003  Takekuma ........... H04N 5/2252
                                                     396/25
(Continued)

FOREIGN PATENT DOCUMENTS

EP     1548532 A1    6/2005
JP     2000092357   * 9/1998   ............. H04N 5/225
(Continued)

OTHER PUBLICATIONS

The Extended European Search Report dated Nov. 4, 2015 for the related European Patent Application No. 15165544.6.
(Continued)

*Primary Examiner* — Lindsay J Uhl
(74) *Attorney, Agent, or Firm* — McDermott Will & Emery LLP

(57) ABSTRACT

An imaging apparatus in an embodiment includes lens optical systems each including a lens whose surface closest to the target object is shaped to be convex toward the target object, imaging regions which respectively face the lens optical systems and output a photoelectrically converted signal corresponding to an amount of light transmitting the lens optical systems and received by the imaging regions, and a light-transmissive cover which covers an exposed portion of the lens of each of the lens optical systems and a
(Continued)

portion between the lens of one of the lens optical systems and the lens of another one of the lens optical systems adjacent to the one of the lens optical systems, the cover having a curved portion which is convex toward the target object. The optical axes of the lens optical systems are parallel to each other.

6 Claims, 7 Drawing Sheets

Related U.S. Application Data continuation of application No. 15/843,845, filed on Dec. 15, 2017, now Pat. No. 10,757,370, which is a continuation of application No. 14/693,913, filed on Apr. 23, 2015, now Pat. No. 9,876,992.

(51) Int. Cl.
*H04N 5/247* (2006.01)
*G02B 27/00* (2006.01)
*G06T 7/593* (2017.01)
*G03B 35/08* (2021.01)
*G02B 13/00* (2006.01)
*G03B 17/08* (2021.01)

(52) U.S. Cl.
CPC ........... *H04N 5/247* (2013.01); *G02B 13/001* (2013.01); *G02B 27/0006* (2013.01); *G03B 17/08* (2013.01); *G06T 2207/30252* (2013.01)

(56) References Cited

U.S. PATENT DOCUMENTS

| | | | |
|---|---|---|---|
| 8,256,112 B2 | 9/2012 | Kang | |
| 8,526,112 B2 * | 9/2013 | Baba ................ | A61B 1/00096 600/101 |
| 9,876,992 B2 | 1/2018 | Imamura et al. | |
| 10,757,370 B2 * | 8/2020 | Imamura ................ | G03B 35/08 |
| 2005/0165508 A1 | 7/2005 | Kanda et al. | |
| 2005/0200978 A1 | 9/2005 | Tesar et al. | |
| 2006/0209185 A1 | 9/2006 | Yokoi | |
| 2008/0151079 A1 | 6/2008 | Iijima et al. | |
| 2008/0304705 A1 | 12/2008 | Pomerleau et al. | |
| 2009/0043155 A1 | 2/2009 | Fujimori | |
| 2009/0174804 A1 | 7/2009 | Iijima et al. | |
| 2009/0207246 A1 | 8/2009 | Inami et al. | |
| 2009/0225432 A1 | 9/2009 | Toyoda et al. | |
| 2010/0246892 A1 * | 9/2010 | Hirasawa ................ | G01C 3/085 382/106 |
| 2011/0080487 A1 | 4/2011 | Venkataraman et al. | |
| 2011/0096400 A1 | 4/2011 | Ando et al. | |
| 2011/0261472 A1 | 10/2011 | Yamakawa | |
| 2012/0170119 A1 | 7/2012 | Chu et al. | |
| 2012/0243093 A1 | 9/2012 | Tonar et al. | |
| 2012/0250153 A1 | 10/2012 | Kawasaki et al. | |
| 2012/0250165 A1 | 10/2012 | Do | |
| 2013/0057732 A1 | 3/2013 | Uemura | |
| 2014/0240469 A1 * | 8/2014 | Lee ........................ | G01C 11/14 348/48 |
| 2014/0247390 A1 | 9/2014 | Ohsumi | |
| 2015/0138336 A1 | 5/2015 | Ueno et al. | |
| 2015/0172543 A1 * | 6/2015 | Laroia ................ | H04N 5/23232 348/262 |
| 2015/0248772 A1 | 9/2015 | Gove et al. | |
| 2015/0296108 A1 | 10/2015 | Hayakawa et al. | |

FOREIGN PATENT DOCUMENTS

| | | | |
|---|---|---|---|
| JP | 2000-092357 A | | 3/2000 |
| JP | 2000092357 A | * | 3/2000 |
| JP | 2001-318423 A | | 11/2001 |
| JP | 2002-344786 A | | 11/2002 |
| JP | 2005-128273 A | | 5/2005 |
| JP | 2005-143991 A | | 6/2005 |
| JP | 2007-043225 A | | 2/2007 |
| JP | 2008-006301 A | | 1/2008 |
| JP | 2009-164654 A | | 7/2009 |
| JP | 2009-211012 A | | 9/2009 |
| JP | 2010-194099 A | | 9/2010 |
| JP | 2011-172174 A | | 9/2011 |
| JP | 2012-215807 A | | 11/2012 |
| JP | 2013-109268 A | | 6/2013 |
| JP | 2013-112314 A | | 6/2013 |
| JP | 2013-148634 A | | 8/2013 |
| KR | 20100095260 A | | 8/2010 |
| KR | 101011269 B1 | | 1/2011 |
| KR | 101011269 B1 | * | 1/2011 |
| WO | 2009/153953 A1 | | 12/2009 |
| WO | 2014/017405 A1 | | 1/2014 |
| WO | 2014/171513 A1 | | 10/2014 |

OTHER PUBLICATIONS

Non-Final Office Action issued in U.S. Appl. No. 14/693,913, dated Dec. 12, 2016.
Non-Final Office Action issued in U.S. Appl. No. 14/693,913, dated May 1, 2017.
Notice of Allowance issued in U.S. Appl. No. 14/693,913, dated Sep. 29, 2017.
Non-Final Office Action issued in corresponding U.S. Appl. No. 15/843,845, dated Jan. 10, 2020.
Non-Final Office Action issued in corresponding U.S. Appl. No. 15/843,845, dated May 21, 2019.
Non-Final Office Action issued in corresponding U.S. Appl. No. 15/843,845, dated Aug. 24, 2018.
Final Office Action issued in corresponding U.S. Appl. No. 15/843,845, dated Aug. 21, 2019.
Final Office Action issued in corresponding U.S. Appl. No. 15/843,845, dated Feb. 14, 2019.
Notice of Allowance issued in corresponding U.S. Appl. No. 15/843,845, dated Apr. 22, 2020.
Non-Final Office Action dated Sep. 24, 2020 in U.S. Appl. No. 16/932,270.
Notice of Allowance dated Jan. 13, 2021 in U.S. Appl. No. 16/932,270.
The Extended European Search Report dated Jun. 21, 2021 for the related European Patent Application No. 21166563.3.

* cited by examiner

IMAGING APPARATUS AND DISTANCE MEASURING APPARATUS USING THE SAME

RELATED APPLICATIONS

This application a Continuation Application of U.S. patent application Ser. No. 16/932,270, filed on Jul. 17, 2020, which is a Continuation Application of U.S. patent application Ser. No. 15/843,845, filed Dec. 15, 2017, now U.S. Pat. No. 10,757,370, which is a Continuation Application of U.S. application Ser. No. 14/693,913, filed on Apr. 23, 2015, now U.S. Pat. No. 9,876,992, which claims the benefit of Japanese Application No. 2014-093616, filed on Apr. 30, 2014, the entire disclosures of which Applications are incorporated by reference herein.

BACKGROUND

Technical Field

The present disclosure relates to an imaging apparatus having multiple imaging optical systems and a distance measuring apparatus that measures the distance to a target object based on parallax in images captured by multiple imaging optical systems.

Description of the Related Art

Polynocular distance measuring apparatuses are known that capture images of a target object for measurement with an imaging apparatus having multiple imaging optical systems and measure the distance to the target object by making use of the parallax between the captured images. Such polynocular distance measuring apparatuses are utilized in driving assist systems for automobiles, three-dimensional shape measuring systems, and the like.

In a polynocular distance measuring apparatus for monitoring the front view of an automobile, multiple monocular imaging apparatuses are usually installed on the inner side of the windshield such that their optical axes are parallel to each other. Japanese Unexamined Patent Application Publication No. 2013-112314 discloses an example of a polynocular distance measuring apparatus of this type.

In applications for monitoring the rear view and the surroundings of an automobile, in contrast, an ultrawide-angle monocular imaging apparatus is used for the purpose of aiding in visibility. Japanese Unexamined Patent Application Publication No. 2013-109268 discloses an example of such an ultrawide-angle monocular imaging apparatus.

SUMMARY

In a situation where a polynocular distance measuring apparatus is used when it rains, for example, a sufficient distance measuring performance may not be obtained due to adhesion of water droplets between lenses.

One non-limiting and exemplary embodiment provides an imaging apparatus that makes it difficult for any adhering water droplet, such as a raindrop, to stand between lenses.

In one general aspect, the techniques disclosed here feature an imaging apparatus for capturing an image of a target object, including: lens optical systems each including a lens whose surface closest to the target object is shaped to be convex toward the target object; imaging regions which respectively face the lens optical systems and output a photoelectrically converted signal corresponding to an amount of light transmitting the lens optical systems and received by the imaging regions; and a light-transmissive cover which covers an exposed portion of the lens of each of the lens optical systems and a portion between the lens of one of the lens optical systems and the lens of another one of the lens optical systems adjacent to the one of the lens optical systems, the cover having a curved portion which is convex toward the target object, in which optical axes of the lens optical systems are parallel to each other.

The imaging apparatus according to an aspect of the present disclosure makes it difficult for an adhering water droplet such as a raindrop to stand on its surface and reduces the possibility of temporary reduction in image capturing performance.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
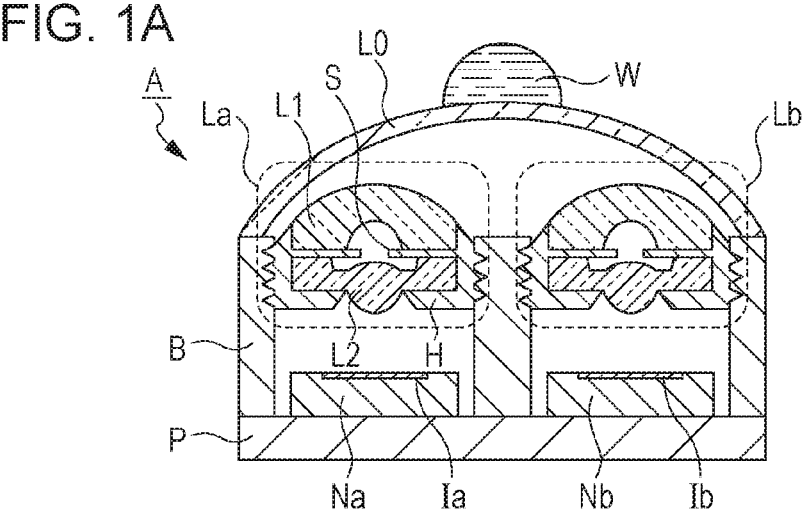
FIG. 1A is a schematic illustration of an imaging apparatus according to Embodiment 1 of the present disclosure.

In implementation of a polynocular distance measuring apparatus for monitoring the rear view or surroundings of a vehicle with combination of the aforementioned techniques, an arrangement in which multiple ultrawide-angle monocular imaging apparatuses are arrayed close to each other may be conceivable because the distance to the target object is assumed to be several meters or less. In general, the surface of the topmost lens of an ultrawide-angle taking lens is shaped to be convex on the object side. Thus, a water droplet tends to stand between the topmost lens of one monocular imaging apparatus and the topmost lens of the adjacent monocular imaging apparatus. A water droplet standing between adjacent lenses in a polynocular distance measuring apparatus can lead to an insufficient distance measurement performance.

Embodiments of the present disclosure will be generally described as follows.

According to an aspect of the present disclosure, an imaging apparatus for capturing an image of a target object includes: lens optical systems each including a lens whose surface closest to the target object is shaped to be convex toward the target object; imaging regions which respectively face the lens optical systems and output a photoelectrically converted signal corresponding to an amount of light transmitting the lens optical systems and received by the imaging regions; and a light-transmissive cover which covers an exposed portion of the lens of each of the lens optical systems and a portion between the lens of one of the lens optical systems and the lens of another one of the lens optical systems adjacent to the one of the lens optical systems, the cover having a curved portion which is convex toward the target object, in which optical axes of the lens optical systems are parallel to each other. With the imaging apparatus according to this aspect of the present disclosure, the dome shape of the cover makes it difficult for any water droplet adhering to the cover to stand there.

In an embodiment, the lens of each of the lens optical systems may be a concave meniscus lens.

In an embodiment, the cover may cover an entire exposed portion of the lens optical systems on the target object side.

In an embodiment, the cover may be made of glass.

In an embodiment, the lens of each of the lens optical systems may be made of resin.

In an embodiment, each of the lens optical systems may have an angle of view of 120° or more in at least one direction.

In an embodiment, the cover may be water repellent.

In an embodiment, |f0|>50 fx may be satisfied, where f0 represents a focal length of the cover and fx represents the focal length of each of the lens optical systems.

In an embodiment, each of the lens optical systems may include n (n being an integer greater than 0) single lenses including the lens, and a k-th (k is an integer greater than 0 and equal to or less than n) single lens from a target-object-side end of each of the lens optical systems may be integrally formed with a k-th single lens from a target-object-side end of another lens optical system. The single lenses included in each of the lens optical systems may have the same shapes. The single lenses included in each of the lens optical systems may have different shapes. The k-th single lens from the target-object-side end of each of the lens optical systems may be fused with the k-th single lens from the target-object-side end of another lens optical system. The k-th single lens from the target-object-side end of each of the lens optical systems may be fixedly attached to the k-th single lens from the target-object-side end of another lens optical system.

In an embodiment, all single lenses included in each of the lens optical systems may be integrally formed with the single lenses of another lens optical system that are located at corresponding positions.

In an embodiment, the imaging regions may be provided in a single image sensor.

In an embodiment, the imaging regions may be respectively provided in a plurality of image sensors.

In an embodiment, the imaging apparatus may further include body tubes each housing the lens of each of the lens optical systems, in which a minimum distance between adjacent body tubes may be 15 mm or less.

In an embodiment, an angle between the optical axis of each of the lens optical systems and a normal to a tangent line at an end of an effective diameter of the cover across which light from the target object passes through may be 75 degrees or less.

In an embodiment, the lens optical systems may be arranged in one direction, and a cross section of the cover that is perpendicular to the one direction may have an arch shape. The cover may have a dome shape.

According to another aspect of the present disclosure, a distance measuring apparatus includes the imaging apparatus described in any of the above embodiments and a computation circuit, in which in operation, the computation circuit measures a distance to a target object based on a parallax of the target object in images obtained in imaging regions of the imaging apparatus. The computation circuit may measure the distance to the target object by using a baseline length between two lens optical systems, a focal length of each of the lens optical systems and the parallax of the target object in two images obtained in the two imaging regions of the imaging apparatus.

In an embodiment, the distance measuring apparatus may further include an output device that outputs information corresponding to the distance measured by the computation circuit.

The embodiments will now be described more specifically. In the description that follows, the same or like components are denoted with the same reference characters. In the description that follows, a signal or information representing an image may be referred to just as an "image".

Embodiment 1

Figure 1B:
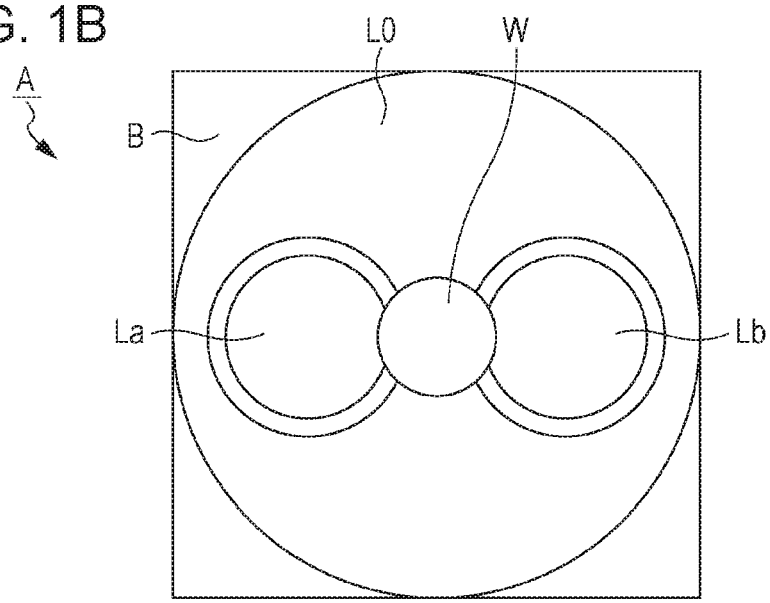
FIG. 1B is a front view of the imaging apparatus of FIG. 1A seen from the object side.

FIG. 1A is a schematic illustration of an imaging apparatus A according to Embodiment 1, and FIG. 1B is a front view of the imaging apparatus A seen from the object (target object) side. The imaging apparatus A includes a first lens optical system La, a second lens optical system Lb, a first image sensor Na, and a second image sensor Nb. The first lens optical system La and the second lens optical system Lb are both ultrawide-angle lens optical systems with a horizontal angle of view of 120° or more. Herein, a lens optical system that has an angle of view of 120° or more in at least one selected from the group of the horizontal, vertical, and diagonal directions is referred to as an "ultrawide-angle" lens optical system.

The imaging apparatus A also includes a casing B that houses and maintains the aforementioned components, and a circuit board P. On the casing B, a light-transmissive, dome-shaped cover L0 is disposed that covers the entire exposed portion of a first lens L1 positioned on the top of each of the first lens optical system La and the second lens optical system Lb. The cover L0 has a curved portion which is convex on the target object side (the upper side in FIG. 1A). As used herein, the term "dome-shaped" widely means a shape that has a curved portion, such as a part of a sphere or an ellipsoid, for example. In this embodiment, the shape of the cover L0 is illustrated as a part of a sphere, though this is not a limitation.

The first lens optical system La and the second lens optical system Lb have the identical structure and light gathering characteristics. The lens optical systems La, Lb each include the first lens L1, a stop S, and a second lens L2, which are held by a lens holder H. When the lens optical systems are ultrawide, the topmost first lens L1 is a concave meniscus lens that is convex on the object side as shown in FIG. 1A. Although each lens optical system is illustrated as being formed of two lenses herein, lens optical systems formed of three or more lenses may be used.

The first image sensor Na has an imaging region 1a and the second image sensor Nb has an imaging region 1b. The imaging region 1a is disposed so as to face the bottom surface of the first lens optical system La (the exposed surface of the lowermost lens in FIG. 1A), while the imaging region 1b is disposed so as to face the bottom surface of the second lens optical system Lb. The imaging regions 1a and 1b have a structure in which multiple light detection cells (pixels) composed of photodiode or the like are two-dimensionally and periodically arrayed. Each pixel outputs a photoelectrically converted signal corresponding to the amount of received light through photoelectric conversion. The photoelectrically converted signals are sent to a signal processing circuit (not shown) connected to the circuit board P in which they undergo various kinds of signal processing and multiple images are generated.

FIGS. 1A and 1B also illustrate a water droplet W adhering to the cover L0. By providing the cover L0, this embodiment can prevent the water droplet W from standing between the topmost lenses of the two lens optical systems La, Lb.

Figure 6:
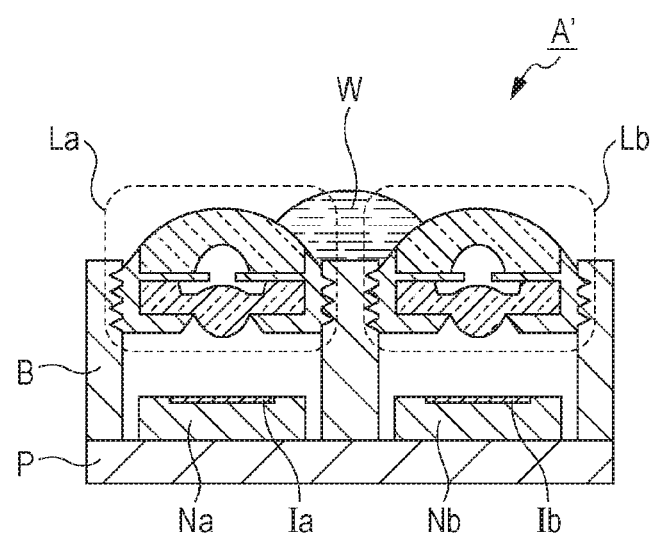
FIG. 6 is a schematic illustration of an imaging apparatus as a comparative example.

Consider now a case where the cover L0 shown in FIG. 1A is not provided. FIG. 6 schematically illustrates an imaging apparatus A' without a dome-shaped cover attached to it. The reference characters given to the components in FIG. 6 are the same as in FIG. 1A. When the imaging apparatus A' is used for monitoring the rear view or the surroundings of an automobile, it is typically installed outside the vehicle interior, so water droplets can adhere to it when it rains and during a car wash. Since the first lens optical system La and the second lens optical system Lb form a recessed portion between them due to the structure of the imaging apparatus A' as illustrated in FIG. 6, an adhering water droplet W is likely to stand there. Adhesion of water droplet W in this portion can cause an unwanted object such as the water droplet or dust to show up in an image.

In contrast, by disposing the light-transmissive dome-shaped cover L0 so as to cover the exposed portion of the first lens L1 positioned on top of each of the first lens optical system La and the second lens optical system Lb as well as the entire portion between the two first lenses L1 as illustrated in FIG. 1A, an adhering water droplet, if any, is less likely to stand on the surface than when the cover L0 is not present. Making the cover L0 water repellent could further reduce the possibility of a water droplet standing. These make it difficult for a water droplet adhering to the imaging apparatus A, if any, to stand there, thus reducing the possibility of an unwanted object such as a water droplet or dust showing up in an image.

Next, an arrangement for applying the imaging apparatus described above to a distance measuring apparatus will be described.

Figure 1C:
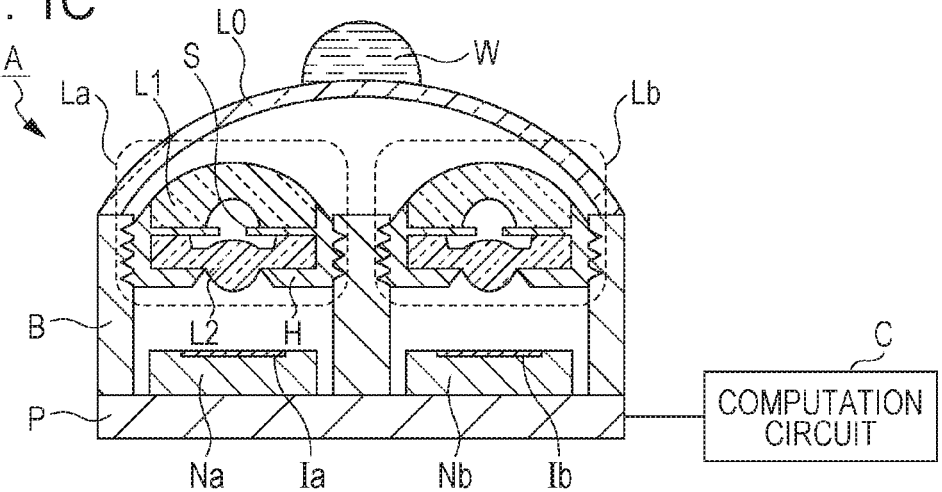
FIG. 1C is a schematic illustration of a distance measuring apparatus in Embodiment 1.

FIG. 1C generally illustrates the structure of the distance measuring apparatus. The distance measuring apparatus includes the imaging apparatus A described above and a computation circuit C that measures the distance to the target object based on the parallax of the target object in multiple images output from the imaging apparatus A. The computation circuit C may be implemented as an electronic circuit such as a digital signal processor (DSP) or a combination of a computation unit such as a central processing unit (CPU) and a memory storing a program.

Light from the target object for distance measurement (not shown) passes through the cover L0 and then forms an image in the imaging region 1a of the first image sensor Na and the imaging region 1b of the second image sensor Nb via the first lens optical system La and the second lens optical system Lb. The first image sensor Na and the second image sensor Nb generate and output a first image signal and a second image signal respectively. The computation circuit C applies calibrating correction such as coordinate and distortion corrections to the first and second image signals, thereby converting the first and second image signals into images adapted for parallax calculation based on pattern matching. Then, pattern matching is conducted between the two images. Specifically, focusing on a minute region of a predetermined number of pixels in the first image, an evaluation function is calculated while moving a minute region of the same size in the second image by one pixel at a time in the baseline direction (the horizontal direction in FIG. 1C) and the position with the highest correlation is found, thereby extracting the parallax between the first image and the second image in the minute regions. For the evaluation function, sum of absolute difference (SAD) or sum of squared difference (SSD) may be used, for example. The computation circuit C uses a baseline length between the first lens optical system La and the second lens optical system Lb, a focal length of each of the first lens optical system La and the second lens optical system Lb and the extracted parallax to calculate the real-world distance to the object captured in the minute region based on the principle of triangulation. By conducting the parallax extraction in the minute region over the entire image, a distance map for the entire image can be generated.

Since in this embodiment the presence of the cover L0 which has a dome shape reduces the possibility of an unwanted object such as a water droplet or dust showing up in a captured image, situations in which accurate distance measurement cannot be performed can be reduced.

While this embodiment was described in the context of a structure with two lens optical systems, a structure with three or more lens optical systems arranged two-dimensionally is also possible. With two lens optical systems, an accurate distance measurement cannot be obtained when there is no light-dark contrast in a direction parallel to the baseline in an image because only one baseline direction exists. Also, as mentioned above, since the topmost lens of an ultrawide-angle lens is usually a concave meniscus lens that is convex on the object side as shown in FIG. 1A, adjacent lenses will show up in each other's image when the angle of view is wide. Thus, measurement over a wide field of view, for example, an angle of view of 180°, cannot be performed.

Figure 2A:
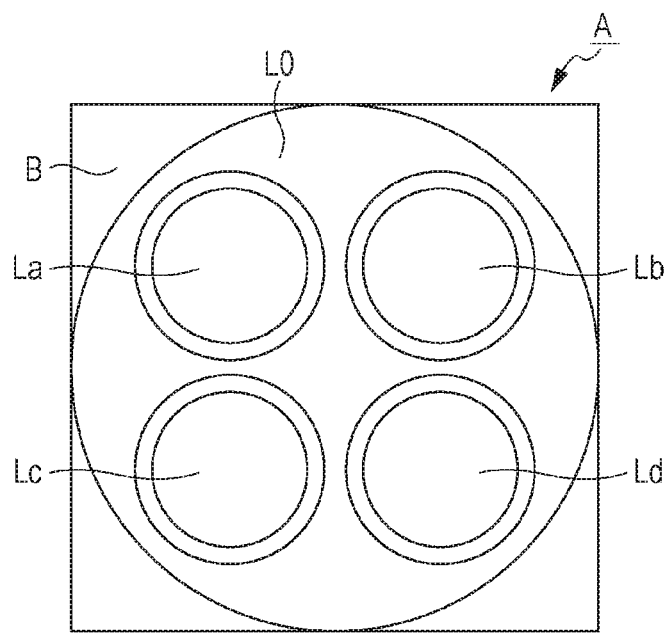
FIG. 2A is a front view of the imaging optical systems in the imaging apparatus seen from the object side in a modification of Embodiment 1.
Figure 2B:
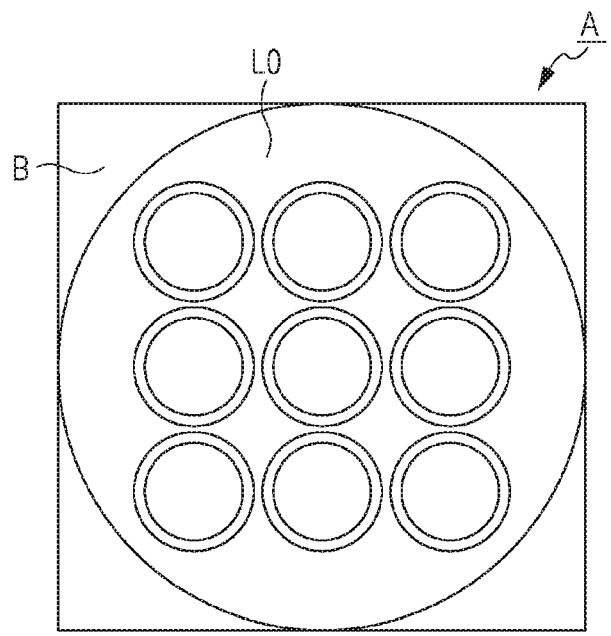
FIG. 2B is a front view of the imaging optical systems in the imaging apparatus seen from the object side in another modification of Embodiment 1.

A structure with four lens optical systems La, Lb, Lc, Ld arrayed as shown in FIG. 2A or a structure with nine lens optical systems arrayed as shown in FIG. 2B may be adopted. In the case of two-dimensional arrangement of lens optical systems as illustrated in FIGS. 2A and 2B, pattern matching can be performed in two orthogonal baseline directions (the horizontal and vertical directions in FIGS. 2A and 2B). Therefore, if the image has no light-dark contrast in one of the baseline directions, distance measurement is still possible if there is light-dark contrast in the other baseline direction.

With a structure having lens optical systems arranged two-dimensionally, distance measurement can be performed with the field of view shared among the multiple lens optical systems, so measurement over the entire view field of the angle of view provided by each lens optical system is possible. For instance, focusing on the pair of lens optical systems La and Lb in FIG. 2A, lens optical systems Lb, Lc, Ld would show up in an image captured in the imaging region which faces the lens optical system La, while lens optical systems La, Lc, Ld would show up in an image captured in the imaging region which faces the lens optical system Lb. However, measurement for the image portions in which lenses show up can be compensated with other lens pairs. Specifically, pairs of lens optical system Lb and Ld, Lc and Ld, and La and Lc can cover the portion for which measurement cannot be carried out with the lens optical systems La and Lb. That is, lens optical system pairs can mutually complement for a portion in which measurement cannot be performed.

Such an arrangement enables accurate distance measurement over a wide range. For example, when each lens optical system has an angle of view of 180°, distance measurement over the field of view area of a hemisphere is possible.

Specific methods for calculating a distance from multiple ultrawide-angle images as described above are disclosed by Japanese Patent Application No. 2013-258380 and a specification of U.S. patent application Ser. No. 14/555,643, for instance, the entire contents of which are incorporated herein.

The cover L0 in this embodiment will be described in more detail.

The cover L0 can be designed to have extremely small lens effect. As used herein, "extremely small lens effect" means that $|f0|>50$ fx is satisfied, where f0 represents the focal length of the light-transmissive cover L0, and fx represents the focal length of each of lens optical systems La and Lb, for example. Since the optical axis of each lens optical system is eccentric to the center axis of the cover L0, if the cover L0 has lens effect, asymmetry of optical characteristics, such as distortion, between the positive side and the negative side of the angle of view in each lens optical system would be large. Such asymmetry of optical characteristics can lead to reduced accuracy of distance measurement. In contrast, when the cover L0 has extremely small lens effect, optical characteristics such as distortion is more symmetric between the positive side and the negative side of the angle of view, preventing a reduction in distance measurement accuracy. It is noted that depending on the characteristics of lens optical systems, it can be desirable to intentionally impart lens function to the cover L0. In such a case, the focal length f0 of the cover L0 may be designed to be 50 fx or less.

Figure 3:
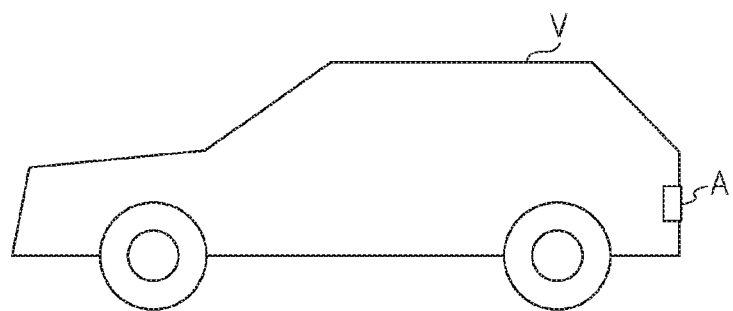
FIG. 3 illustrates an example of a vehicle on which the imaging apparatus in Embodiment 1 is installed.

The cover L0 may be made of glass. In a case where the imaging apparatus or the distance measuring apparatus according to this embodiment is installed on a vehicle, such as an automobile, for monitoring the rear view or the surroundings, it is usually installed outside the vehicle interior. FIG. 3 illustrates a case in which the imaging apparatus A according to this embodiment is installed on vehicle V such as an automobile. When the imaging apparatus A is installed outside the vehicle interior, a cover L0 made of resin would be sensitive to scratch during a car wash and the like. In contrast, a cover L0 made of glass is more resistant to scratch during a car wash and the like. The vehicle V may further include a computation circuit that, in operation, measures the distance to the target object based on the parallax of the target object in multiple images obtained in multiple imaging regions of the imaging apparatus A, and an output device that outputs information corresponding to the distance to the target object measured by the computation circuit. Such an arrangement allows the driver of the vehicle V to know the distance to the target object. The target object may include a pedestrian or an obstacle, for example. Information output by the output device may include sound and image, for example. More specifically, the output device may issue a warning tone when a pedestrian or an obstacle is present within a certain distance from the vehicle V, for example.

When the cover L0 is made of glass, the topmost lenses of the first lens optical system La and the second lens optical system Lb may be made of resin. For a lens optical system for monitoring the rear side or the surroundings of a vehicle, the topmost lens is typically composed of glass for protection against scratches. However, fabricating the cover L0 with glass permits the topmost lenses of the first lens optical system La and the second lens optical system Lb to be formed of resin. As glass lenses are generally more expensive than resin lenses, adopting resin lenses for the topmost lenses of the first lens optical system La and the second lens optical system Lb can keep the costs of the imaging apparatus A low.

Embodiment 2

Embodiment 2 differs from Embodiment 1 in that two imaging regions la and lb are provided in a single image sensor. Detailed description of matters similar to Embodiment 1 is omitted and the difference will be mainly discussed.

Figure 4:
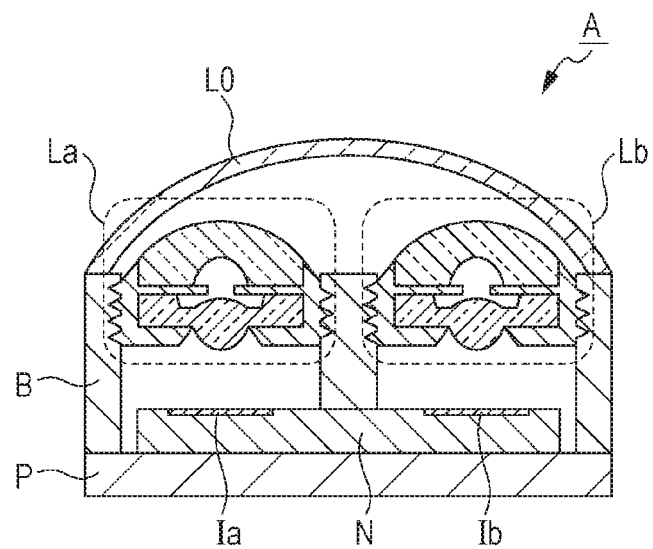
FIG. 4 is a schematic illustration of the imaging apparatus in Embodiment 2 of the present disclosure.

FIG. 4 is a schematic illustration of the imaging apparatus A in Embodiment 2. While Embodiment 1 provides image sensors Na and Nb respectively corresponding to the two lens optical systems La and Lb, Embodiment 2 provides a single image sensor N having two imaging regions la and lb.

By thus combining the image sensors corresponding to the first lens optical system La and the second lens optical system Lb into a single image sensor, relative inclination of the two imaging surfaces can be decreased compared to when separate image sensors are used. This can suppress reduction in the accuracy of distance measurement compared to the structure of Embodiment 1.

Although FIG. 4 depicts the two imaging regions la and lb in the image sensor N as separate regions, an additional imaging region with multiple pixels may be provided between them. Since that portion is not used for image capturing, however, pixels may be provided only in the imaging region la and lb portions shown in FIG. 4.

Embodiment 3

Embodiment 3 differs from Embodiments 1 and 2 in that at least one lens included in each of lens optical systems is formed integrally with a corresponding lens of another lens optical system. In other words, assuming that each of multiple lens optical systems is composed of a combination of n (n being an integer greater than 0) single lenses including the topmost first lens L1, in this embodiment, the k-th (k is an integer greater than 0 and equal to or less than n) single lens from the target object side of each lens optical system is integrally formed with the k-th single lens from the target object side of another lens optical system.

Figure 5A:
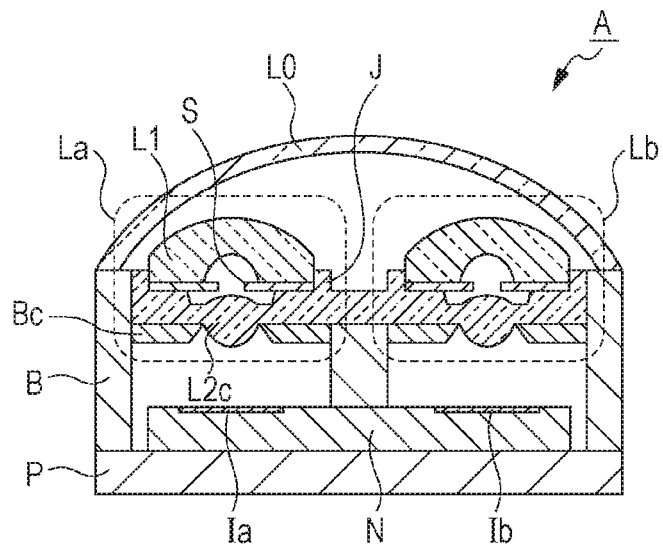
FIG. 5A is a schematic illustration showing an example of the imaging apparatus in Embodiment 3 of the present disclosure.

FIG. 5A schematically illustrates an example of the imaging apparatus A having such a structure. In FIG. 5A, the second lens from the target object side of the first lens optical system La and the second lens from the target object side of the second lens optical system Lb are integrally formed into a compound-eye lens L2c. The compound-eye lens L2c is fabricated as a single article with a mold. The compound-eye lens L2c is also configured to be placed on a lens holding portion Bc provided in the casing B. Thus, the interval between the object surface side (the upper side in FIG. 5A) of the lens holding portion Bc and each imaging region represents the flange focal length of each lens optical system. On the object surface side of the compound-eye lens L2c, a cylindrical guide J is formed about the optical axis of each lens optical system, so that components can be positioned by inserting the stop S and the first lens L1 of each lens optical system along the guide J.

While in Embodiment 1 the individual single lenses constituting each lens optical system are separate lenses, integral formation of the second lenses of the lens optical systems as in Embodiment 3 can keep the costs of the imaging apparatus A low.

Figure 5B:
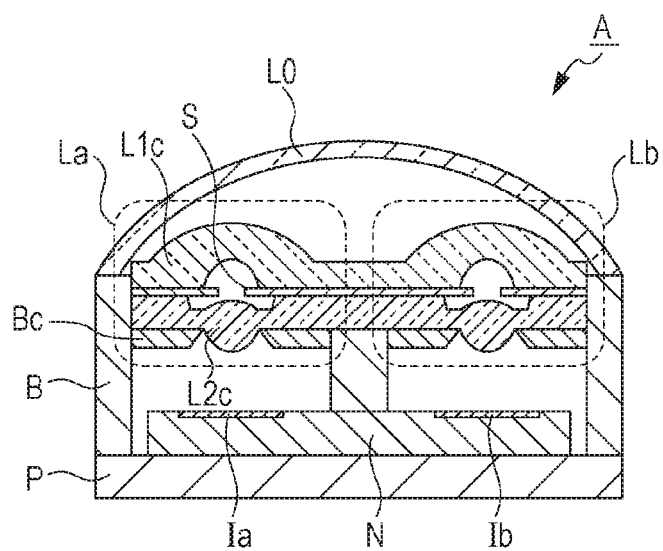
FIG. 5B is a schematic illustration showing another example of the imaging apparatus in Embodiment 3 of the present disclosure.

In addition to the structure with integral formation of the second lenses of the lens optical systems, the first lenses of the lens optical systems may also be integrally formed into a compound-eye lens L1c as illustrated in FIG. 5B. Such a structure could further reduce the costs of the imaging apparatus A.

In a case where each lens optical system is formed from a combination of three or more single lenses, at least one pair of single lenses may be integrally formed. Also, when three or more lens optical systems are used, multiple single lenses located at the same position counted from the target object side may be integrally formed.

Other Embodiments

Figure 7A:
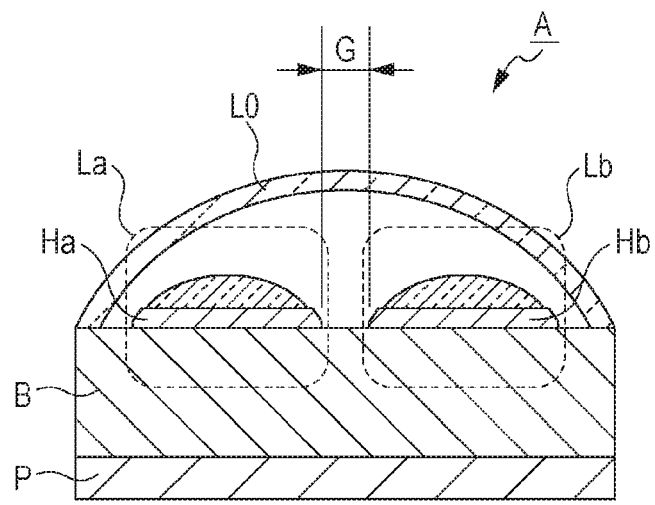
FIG. 7A is a schematic illustration showing an example of the imaging apparatus in another embodiment of the present disclosure.

FIG. 7A is a schematic illustration of an example of an imaging apparatus according to another embodiment of the present disclosure. In FIG. 7A, the minimum distance G between the body tube Ha of the first lens optical system La and the body tube Hb of the second lens optical system Lb is set to 15 mm or less. When the minimum distance G is 15 mm or less, raindrops are likely to stand between the body tube Ha and the body tube Hb, so attachment of the cover L0 is particularly effective.

Figure 7B:
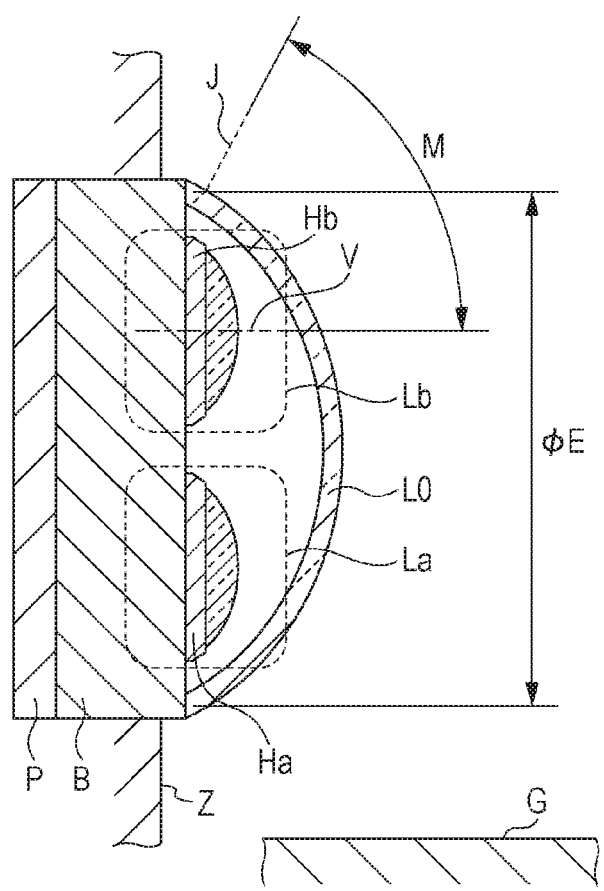
FIG. 7B is a schematic illustration showing an example of the imaging apparatus in still another embodiment of the present disclosure.

FIG. 7B is a schematic illustration of an example of an imaging apparatus according to still another embodiment of the present disclosure. In this example, the imaging apparatus is installed on a vehicle Z such that the optical axis V of the lens optical system is parallel to the ground G. In FIG. 7B, the angle M between the optical axis V of the lens optical system and the normal J to the tangent line at an end of the effective diameter $\phi E$ across which a light beam passes through the cover L0 is set to 75 degrees or less. When the imaging apparatus is thus installed on a vehicle and the like with the optical axis V of the lens optical system being parallel to the ground G, setting the angle M to 75 degrees or less makes raindrops adhering to the surface of the cover L0 easy to flow. Consequently, raindrops are less likely to stand on the surface of the cover L0.

Figure 8:
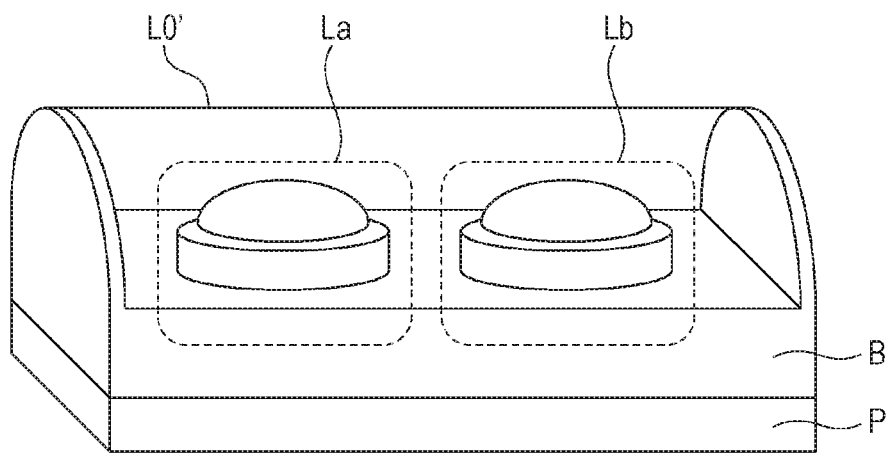
FIG. 8 is a schematic illustration showing an example of the imaging apparatus in yet another embodiment of the present disclosure.

FIG. 8 is a schematic illustration of an example of an imaging apparatus according to yet another embodiment of the present disclosure. In this example, two lens optical systems La, Lb are arranged in one direction as illustrated in FIG. 8, the cross section of the cover L0' having an arch shape which is uniform in the direction in which the two lens optical system are arranged. If a cover shaped in a sphere or an ellipsoid is used in the case of arrangement of two lens optical systems in one direction, each lens optical system including the cover becomes an eccentric optical system. Consequently, various aberrations would vary between the lens optical systems, possibly causing a reduction in distance measurement accuracy. With a structure such as shown in FIG. 8, in contrast, each lens optical system is not an eccentric optical system, so that difference in various aberrations between the lens optical systems can be lessened compared to when a spherical or ellipsoid cover is used. As a result, a reduction in distance measurement accuracy can be suppressed.

While the foregoing embodiments described the topmost lens (the surface closest to the target object) of each lens optical system as being a concave meniscus lens, a lens other than a concave meniscus lens may be used if each lens optical system is not ultrawide-angle. Additionally, the cover L0 does not necessarily have to cover the entire exposed portion of the lens optical systems because it can prevent a water droplet from standing in rainy conditions to a certain degree as long as it covers the exposed portion of the topmost lenses of the lens optical systems and the portion between the lenses.

The imaging apparatus and distance measuring apparatus according to the present disclosure are applicable to on-vehicle camera systems, for example. In addition to on-vehicle applications, they may be applied also to image capture systems such as endoscope cameras, for example.

What is claimed is:

1. An imaging apparatus for capturing an image of a target object, comprising:
   lens optical systems each including a lens whose surface closest to the target object is shaped to be convex toward the target object;
   light detection cells which respectively face the lens optical systems;
   retainers each retaining the lens which is closest to the target object in each of the lens optical systems; and
   a cover which covers an exposed portion of the lens of each of the lens optical systems, the cover having a curved portion which is convex toward the target object, wherein:
   in plan view, a center of the cover does not overlap the surface of the lens which is closest to the target object in each of the lens optical systems,
   optical axes of the lens optical systems are fixed to each other,
   each of the lens optical systems has an angle of view of 120 degrees or more in at least one direction, and
   an angle between an optical axis of each of the lens optical systems and a normal to a tangent line at an end of an effective diameter of the cover across which light from the target object passes through is 75 degrees or less.

2. The imaging apparatus according to claim 1, wherein $|f0|>50$ fx is satisfied, where f0 represents a focal length of the cover and fx represents the focal length of each of the lens optical systems.

3. The imaging apparatus according to claim 1, wherein the lens which is closest to the target object in each of the lens optical systems is a concave meniscus lens.

4. The imaging apparatus according to claim 1, wherein the lens optical systems are arranged in a direction, and a cross section of the cover that is perpendicular to the direction has an arch shape.

5. The imaging apparatus according to claim 1, further comprising:
   a computation circuit, wherein
   in operation, the computation circuit measures a distance to the target object based on a parallax of the target object in images obtained in the light detection cells of the imaging apparatus.

6. The imaging apparatus according to claim 1, wherein the lens optical systems include more than four lens optical systems each of which has a different optical axis.

* * * * *